United States Patent [19]

Aharoni et al.

[11] Patent Number: 5,118,579
[45] Date of Patent: Jun. 2, 1992

[54] FLUOROPOLYMER BLENDS FOR COATINGS

[75] Inventors: Shaul M Aharoni, Morris Plains; Ajay Nahata, Chatham; James T. Yardley, Morristown, all of N.J.

[73] Assignee: Allied-Signal Inc., Morris Township, Morris County, N.J.

[21] Appl. No.: 762,998

[22] Filed: Sep. 20, 1991

[51] Int. Cl.⁵ .................. B32B 27/28; C08L 27/12; C08L 27/18
[52] U.S. Cl. .................. 428/422; 428/421; 525/200
[58] Field of Search ............ 525/200; 428/422

[56] References Cited

U.S. PATENT DOCUMENTS

| | | | |
|---|---|---|---|
| 3,910,187 | 10/1975 | Cords | 430/302 |
| 4,130,706 | 12/1978 | Plambeck, Jr. | 526/245 |
| 4,293,674 | 10/1981 | Andrews | 526/327 |
| 4,650,843 | 3/1987 | Yokoyama et al. | 526/245 |
| 4,791,166 | 12/1988 | Saukaitis | 524/544 |
| 5,061,769 | 10/1991 | Aharoni et al. | 526/245 |

*Primary Examiner*—Carman J. Seccuro
*Attorney, Agent, or Firm*—Gerhard H. Fuchs; Richard C. Stewart

[57] ABSTRACT

Blends of amorphous fluoropolymers with copolymer compositions derived form (a) perfluroalkylalkyl acrylate or methacrylate, (b) acrylic, methacrylic or itaconic acid, and (c) a hydroxyl-containing acrylate or methacrylate, in combination, can be cured to form coatings having properties typical of fluorine-containing polymers, with unusually low critical surface energy.

9 Claims, No Drawings

FLUOROPOLYMER BLENDS FOR COATINGS

FIELD OF THE INVENTION

This invention relates to the field of fluropolymers having low surface energy, of the type suitable for protective coatings and release coatings, as well as to the field of optically clear polymers for optical coating and encapsulating applications.

BACKGROUND OF THE INVENTION

Fluoropolymers have found widespread use in demanding applications where their non-stick properties, good thermal and chemical resistance, toughness and abrasion resistance are being used to advantage, such as in coatings.

The present invention provides blends of (a) amorphous fluoropolymers with (b) certain cross-linkable terpolymers derived from fluorine-containing acrylic monomers with non-fluorinated acrylic monomers. These blends can be cured by application of heat to form semi-IPNs (interpenetrating networks) of the cured terpolymer which "trap" the amorphous fluoropolymer component. The cured blends remain amorphous, and they are optically clear. Those which are based on amorphous fluoropolymers containing only carbon and fluorine, and possibly hydrogen and/or oxygen, also have low refractive indexes. Being soluble in specific organic solvents, solutions of the uncured blends can be used to make coatings and to cast films, which are cross-linkable. These coatings are optically clear, robust and strongly adherent to substrates, including glass, polymer films, metals and crystal substrates.

These new polymer blends fill a need for coating materials which have the superior properties of fluoropolymers—such as low refractive index and surface energy, good thermal and chemical resistance—and which at the same time have strong adhesion, flexibility, toughness, and abrasion resistance. The polymer blends of the present invention combine these properties.

SUMMARY OF THE INVENTION

In accordance with the present invention, there are provided novel polymeric compositions comprising a blend of (a) from about 1 to about 95 percent by weight of amorphous fluoropolymer, with (b) from about 5 to about 99 percent by weight of a fluorinated copolymer having the general composition

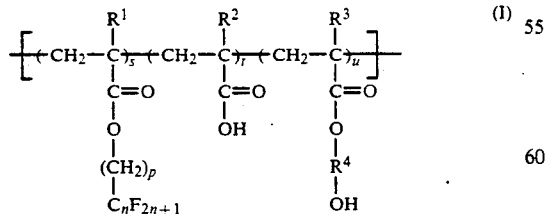

wherein
$R^1$ is H, —$CH_3$, or mixtures thereof;
$R^2$ is H, —$CH_3$, or —$CH_2COOH$;
$R^3$ is H, —$CH_3$, or —$CH_2COOC_mH_{2m+1}$, wherein m is an integer of from about 1 to about 4;
$R^4$ is an alkylene bridging group, straight chain, branched or cyclic, having from 1 to about 8 carbon atoms;
p is 1 or 2;
s, t and u represent weight proportions of the respective monomer-derived units, and have values within the ranges of
s = from about 0.95 to about 0.995;
t = from about 0.0025 to about 0.0475; and
u = from about 0.0025 to about 0.0475;
with the the sum of s+t+u being 1; and
n is an integer of from about 1 to about 40; wherein the monomer-derived units may be arranged in any sequence. In the above formula, t and u may, but need not be the same.

The term copolymer, as used in the specification and claims, is intended to refer to a polymer derived from at least two or more, usually derived from at least three different monomer units. There is no theoretical limit on the number of different monomer units which may be incorporated into the copolymer compositions suitble for use in the polymer blend compositions of the present invention; their number is limited only by the usual practical limitations imposed by polymerization process considerations, and the desire to obtain polymer products having useful properties. Sometimes, these copolymers are also referred to as terpolymers.

The copolymer component of the polymer blend compositions of this invention may also be described as being made up of a polymer chain composed of

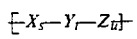

wherein s, t and u have the meanings given in connection with formula (I), above, and wherein X represents monomer-derived units of the composition

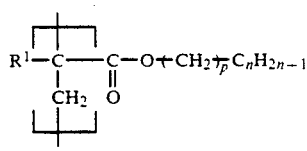

wherein $R^1$, p and n, which may be the same or different in individual X units within the polymer chain, have the meanings given in connection with formula (I), above;

Y represents monomer-derived units of the composition

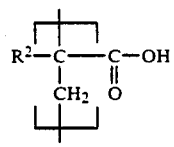

wherein $R^2$, which may be the same or different in individual Y units within the polymer chain, has the meaning given in connection with formula (I), above; and Z represents monomer-derived units of the composition

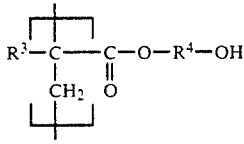

(V)

wherein $R^3$, $R^4$ and r, which may be the same or different in individual Z units within the polymer chain, also have the meanings given in connection with formula (I), above.

In the polymeric compositions of formula (II), above, the X, Y and Z units may be arranged in any sequence. This freedom of arrangement accordingly also prevails for formula (I), above, since formulas (I) and (II) are merely alternate expressions for the same polymeric compositions.

Copolymers of that type and their preparation are more particularly described in commonly assigned copending U.S. application Ser. No. 628,541 filed Dec. 17, 1990 now U.S. Pat. No. 5,061,769 disclosure of which is incorporated by reference. As therein described, they can be prepared by polymerizing the monomers in tetrahydrofuran ("THF") or glacial acetic acid at elevated temperature with a free-radical generating initiator, using procedures conventionally employed in making acrylic and methacrylic polymers. For purposes of the present invention, they are preferably prepared in a polymerization medium comprising glacial acetic acid or 1,1,2-trichloro trifluoroethane.

The term "amorphous fluoropolymer", for purposes of the present invention, defines a normally solid polymer having a fluorine-bearing carbon-to-carbon backbone chain, which is amorphous as determined by X-ray diffraction. As conventionally understood, a polymer is amorphous by X-ray diffraction if it shows only the "amorphous halo" and no crystalline reflections. These amorphous fluoropolymers generally are copolymers of tetrafluroethylene ($CF_2=CF_2$) with other fluorine-bearing comonomers such as, for example, $CH_2=CHF$; $CH_2=CF_2$; $CF_2=CHF$; $CH_2=CH-C_nF_{2n+1}$; $CF_2=CClF$; $CF_2=CF_2=CF-CF_3$; $CF_2=CF-O-C_nF_{2n+1}$; $CF_2=CF-O-CF_2CF(CF_3)-O-CF_2CF_2SO_2F$; $CF_2=CF-O-CF_2CF(CF_3)-O-CF_2CF_2COOCH_3$,

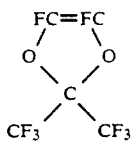

(2,2-bistrifluoromethyl-4,5-difluoro-1,3-dioxole), and the like. The co-monomer serves to prevent crystallization. Any amorphous fluoropolymer composition is suitable for use in the blends of the present invention, provided it has the requisite solubility in solvents in which the terpolymer compositions are also soluble, and it retains its amorphicity in these blends and do not phase separate during and after curing.

Amorphous fluoropolymers are commercially available products. They have a high degree of optical clarity, in combination with the excellent chemical, thermal and electrical properties of conventional crystalline or partially crystalline fluoropolymer, such as polytetrafluroethylene. They have some degree of solubility in a limited selection of solvents. They are, for example, available from E. I. du Pont de Nemours and Company under the designation "Teflon-AF" (T.M.). Those provided by du Pont, for example, are copolymers of tetrafluroethylene with 2,2-bistrifluoromethyl-4,5,-difluoro-1,3-dioxole (see Polymer Preprints 31(1) 312 (1990)).

Coating compositions of the polymer blends can be prepared by separately dissolving the amorphous fluoropolymer and the above-described terpolymer in a suitable solvent for both of these components, such as, for example, the family of fluorinated solvents provided by Minnesota Mining and Manufacturing Company (3M) under its Fluorinert® trademark, e.g. perfluoro(2-n-butyl tetrahydrofuran),

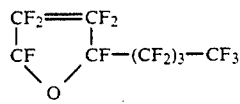

available from 3M under its designation "FC-75" (also described in Macromolecules 10, 1162 (1977)), alone or in combination with 1,1,2-trichloro- trifluoro ethane (TCTFE) as a co-solvent. The resultant solutions can be mixed, in the desired proportions to obtain blends within the above-stated limits. The resultant mixture can in conventional manner be applied to the desired substrate, the solvent evaporated, and the residue polymer blend film can be cured (crosslinked) by application of heat to form a robust, strongly adherent coating.

These polymer blends are generally optically clear, without haze or inhomogeneities. They have refractive indexes below about 1.4 and as low as about 1.327; good adhesion to glass, silicon, copper foil, polyimide, aromatic or aliphatic polyamide, e.g. nylon, polyethylene terephthalate, polychlorotrifluoroethylene and other similar substrates; low surface energy; excellent thermal stability in air; in combination with good mechanical properties—they are neither brittle nor elastomeric. For these reasons they are excellent coating compositions.

In these blends, the terpolymer component can be cross-linked by heat treatment without the use of cross-linking agents. Such heat-induced cross-linking can occur either through internal anhydride formation between two internal carboxyl groups situated on pendant groups of monomer-derived moieties; or by internal esterification between hydroxyl and carboxyl groups. Heat-induced cross-linking has the advantage that no cross-linking agent is required, so that no impurities are introduced; the cured polymer is a single component with no residual solvent, monomer or cross-linking agents. Such cross-linking serves to form a semi-interpenetrating network of the cured terpolymer, which, as above described, serves to "trap" the amorphous fluoropolymer component. Crosslinking improves hardness, scratch resistance and adhesion of the polymer blend coatings, without change in refractive index, and without deleterious effect on any other desirable property. Heat treatment within the temperature range of from about 130° C. to about 150° C. for time periods of from about 0.25 to about 10 hours, desirably of from about 0.5 to 4 hours, results mainly in esterification; heat treatment at higher temperatures, say within the range of from about 170° C. to about 180° C., results in significant anhydride formation. As a general proposition, higher temperatures and longer heat treatment times tend to promote anhydride formation. Cross-linking agents may also be employed, if desired, as to be discussed in further detail below.

The polymer blends of this invention are suitable for use as optical coatings; anti-static coatings; release coatings; for encapsulation of electrical and optical devices and components; and for similar applications where their above-described combination of properties can be used to advantage.

DETAILED DESCRIPTION OF THE INVENTION

The following detailed description sets forth the embodiments, and the examples set forth the best mode presently contemplated for the practice of the invention.

With reference to the "X" units of formula (II), above, which are in more detail defined by formula (III), above, these are derived from fluorine-containing acrylate or methacrylate monomers of the formula

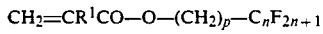
$$CH_2=CR^1CO-O-(CH_2)_p-C_nF_{2n+1}$$

wherein $R^1$, p and n have the meanings given above in connection with formula (II). Those monomers wherein p is 2 are commercially available, as mixtures of homologues having perfluoroalkyl groups of varying chain length, that is to say, as mixtures of homologues differing in "n", as they are ususally obtained in commercial manufacturing operations. Of course, one could separate out individual compounds of defined perfluoroalkyl chain length, if desired for any reason, but this is ordinarily not necessary. Indeed, if the copolymer is to be used for in blends for optical applications, it is desirable to use monomer having a wider distribution of "n", since such wider distribution makes for better amorphicity, hence greater optical clarity, as will the use of mixtures of acrylates (wherein in the above formula $R^1$ is H) with methacrylates (wherein in the above formula $R^1$ is $-CH_3$). Those monomers wherein p is 1 can be prepared using known procedures. Preferably, p is 2 and n is an even number. In preferred embodiments, n ranges from about 2 to about 30, more preferably from about 4 to about 20. Specific examples of preferred embodiments are the products sold by DuPont under its "Zonyl" trademark, e.g Zonyl TM (the methacrylate) and Zonyl TA-N (the acrylate), and sold by by Hoechst-Celanese under its "NUVA-HF" trademark. Such specific examples include mixed perfluoroalkylalkyl acrylates and methacrylates wherein n is predominantly an even number, and in particular wherein the perfluoroalkyl group is represented by a mixture of $C_4$ through $C_{20}$ groups, particularly $C_6$, $C_8$, $C_{10}$ and $C_{12}$ groups.

The "Y" units of formula (II), above, which are in more detail defined by formula (IV), above, are derived from acrylic acid, methacrylic acid, itaconic acid, or mixtures thereof. All of these are commercially available products.

The "Z" units of formula (II), above, which are in more detail defined by formula (V), above, are derived from acrylic acid esters of the formula

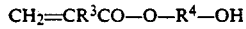
$$CH_2=CR^3CO-O-R^4-OH$$

wherein $R^3$, $R^4$ and r have the afore-stated meanings. In more preferred embodiments, $R^3$ is H or $-CH_3$, with $-CH_3$ being most preferred. For optical applications, use of mixed acrylates and methacrylates may be desirable to maximize amorphicity, hence optical clarity. If $R^3$ is represented by $-CH_2COOC_mH_{2m-1}$, then m is preferably an integer of from about 0 to about 6, more preferably of from about 1 to about 4. With respect to the $R^4$, alkylene bridging group, embodiments having from 2 to about 4 carbon atoms are preferred, as are the linear and branched chain embodiments. Use of mixtures of such monomers of differing carbon-carbon chain length is contemplated. To enhance amorphicity, use of mixtures of such monomers of differing carbon-carbon chain length is desirable and preferred. Many of the esters suitable for furnishing the "Z" units of formula (II), above, are commercially available; those not so available are readily prepared by those skilled in the art, using well-known procedures.

With regard to the weight proportions of the "X", "Y" and "Z" units (see formula II, above), s ranges from about 0.95 to about 0.995, and t and u, which may be the same or different, each range from about 0.0025 to about 0.0475. The preferred range for t+u is from about 0.005 to about 0.05, with values in the range of from about 0.01 to about 0.03 being more preferred yet. As to the weight ratio between t and u (t:u), weight ratios in the range from about 1:0.5 to about 1:1.5 are preferred, with ratios in the range of from about 1:0.8 to about 1:1.2 being more preferred yet. Terpolymers containing approximately equimolar proportions of the "Y" and "Z" components are preferred for use in blends which are intended for heat-induced cross-linking, because then the cross-linking process, as above described, proceeds predominantly by the internal esterification route, with minimal anhydride formation. For many applications, especially those involving prolonged exposure to aqueaous media, particularly at elevated temperatures, the esterification route is preferred because of the better stability of the resultant product.

Polymerization of the monomers to make terpolymer compositions for use in the blends of this invention proceeds readily in solution, desirably in glacial acetic acid or in 1,1,2-trichlorotrifluoroethane (TCTFE), at elevated temperature within the range of from about 35° C. to the boiling point of the polymerization mixture, more desirably within the range of from about 45° C. to the atmospheric pressure boiling point of the solvent, viz. about 110° C. for glacial acetic acid and about 47° C. for TCTFE, under autogenous pressure, typically atmospheric pressure, using a free radical generating initiator, such as 2,2'-azobis(2-methylpropanenitrile) (CAS #78-67-1) available from DuPont under the designation VAZO 64, hereinafter referred to as "AIBN". Other suitable initiators include 2,2'-azobis(2,4-dimethylpentanenitrile) (CAS #4419-11-8 - VAZO® 52) and 2,2'-azobis(2-methylbutanenitrile) (CAS #13472-08-7). The 2,2'-azobis(2-methylpropanenitrile) is preferred.

The catalyst is employed in amount of from about 0.15 to about 0.4 percent by weight, based on the combined weight of all the monomers to be polymerized. The polymerization is conducted under dry nitrogen atmosphere and with continuous agitation. Typical polymerization times range from about 4 hours to about 8 hours. The monomer concentration in the reaction medium typically ranges from about 35 to about 70 percent by weight, based on the combined weight of reaction medium (glacial acetic acid or TCTFE) and the monomers.

Upon conclusion of the polymerization reaction, the polymer product is readily recovered from the reaction mixture, as by evaporation of the solvent and/or cooling the mixture to precipitate the polymer product, followed by separation of liquid and solid phases, as by filtration, and washing of the polymer product to remove residual unreacted monomers using any suitable solvent, if desired. These operation are conventional. The polymer product thus obtained is soluble in a solvent of perfluoro(2-n-butyl tetrahydrofuran) of the formula

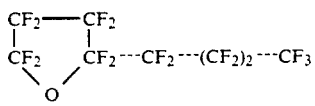

available from 3M as Fluorinert ® FC-75, in concentrations over 10 percent by weight, based on the combined weight of polymer product and solvent. Solution of the polymer in this solvent is aided by mild heating and agitation. Mixtures of Fluorinert ® FC-75 solvent and TCTFE in up to 1:1 vol./vol. ratio are often preferable for rapid dissolution of the terpolymer.

The following examples further illustrate the invention.

EXAMPLE 1

98.85 g of perfluoroalkylethyl methacrylate monomer mixture (DuPont's Zonyl-TM), 1.0 g hydroxyethyl methacrylate, and 1.0 g methacrylic acid were polymerized in 148.6 g of glacial acetic acid at 72° C. over a 6 hour period, using 0.3 g AIBN as initiator. The polymerization progressed remarkably well, and the polymeric product remained soluble in the mixture. The polymer precipitated out of the acetic acid at temperatures below about 50° C. The reaction mixture was poured into water, the polymer precipitated, and recovered. The yield was 80.6 %. The above procedure was repeated, using 1,1,2-trichloro trifluoroethane as polymerization medium and VAZO ®52 as initiator, with comparably good results.

EXAMPLE 2

After work-up and drying, the product of the glacial acetic acid polymerization of Example 1 was dissolved in Fluorinert ® FC-75 solvent under heating at about 75° C. to obtain a 5 % wt./vol. solution of the terpolymer. Upon cooling, the terpolymer remained in solution; no precipitation nor haze was noted. Separately, a 5 % wt./vol. solution of amorphous fluoropolymer (du Pont's Teflon ® AF-1600 resin) in Fluorinert ® FC-75 solvent was prepared at room temperature, and mixed in 1:1 vol./vol. ratio with the above-described solution of the terpolymer. This mixture remained absolutely clear. A portion of this mixture was deposited on a silicon wafer and dried and heated for 10 min. at 120° C. Thereafter, the coating had a refractive index of 1.3452.

The critical surface energy of a coating thus prepared but cured for 30 min. at 135° C. was measured at 7.7 dynes/cm. The critical surface energy of the Teflon ® AF-1600 component of the blend is 15.7 dynes/cm (du Pont's Teflon ® AF-1600 brochure H-07802-1 of 12/89). The lowest critical surface energy that was measured by us on a terpolymer component suitable for use in the blends of the present invention was about 8.8 dynes/cm. That terpolymer component contained a higher proportion of fluorine than the terpolymer component that was used in this example, thus was expected to have a lower critical surface energy than that used herein. Therefore, the fluoropolymer blends of the present invention surprisingly have even lower critical surface energy than their individual constituents.

EXAMPLE 3

Another portion of the 1:1 vol./vol. mixture of Example 2 was diluted with Fluorinert ® FC-75 solvent to 0.62 % wt./vol. total polymer concentration and sprayed on glass and on biaxial nylon-6. Following evaporation of the solvent, the coating was cured by heating to 160° C. for 4 hours. It had a very good visual appearance. The coating was of sturdy mechanical quality and adhered extremely well to the substrates, in dramatic contradistinction to coating on these substrates prepared from the Teflon ® AF-1600 resin alone, which practically fell off these substrates and were very crumbly in appearance.

EXAMPLE 4

A solution of amorphous fluoropolymer (du Pont's Teflon ® AF-1600) and the terpolymer product of Example 1 in 2:1 weight ratio, in a 1:1 vo./vol. solvent mixture of Fluorinert ® FC-75 solvent and 1,1,2-trifluoro trichloroethane was prepared, containing 3 weight % of the polymer blend in the mixed solvent. Glass slides, silicon wafers, polyethylene terephthalate (PET) and nylon-6 films were dip-coated with this polymer blend solution, dried in air, followed by curing at 140° C. for about 1 hour. Solid, adhering coatings were obtained. The refractive index of these coatings was 1.3275 (average of 2 measurements of 1.3273 and 1.3276). Here, again, comparative coatings prepared from the amorphous fluoropolymer alone fell off the substrates upon drying or just by blowing air on them.

When other amorphous fluoropolymers are substituted for the Teflon ® AF-1600 in the procedures of the above examples, similar results are obtained, that it to say mechanically robust, optically clear coatings of good visual appearance are obtained, which adhere well to the above described substrates. These amorphous fluoropolymers preferably include copolymers of tetrafluoroethylene with comonomers selected from the group consisting of $CH_2=CHF$; $CH_2=CF_2$; $CF_2=CHF$; $CH_2=CH\text{-}C_nF_{2n+1}$; $CF_2=CClF$; $CF_2=CF\text{--}CF_3$; $CF_2=CF\text{--}O\text{--}C_nF_{2n+1}$; $CF_2=CF\text{--}O\text{--}CF_2CF(CF_3)\text{--}O\text{--}CF_2CF_2SO_2F$; $CF_2=CF\text{--}O\text{--}CF_2CF(CF_3)\text{--}O\text{--}CF_2CF_2COOCH_3$, and

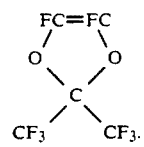

The terpolymer component of the polymer blends of this invention can also be cross-linked employing conventional cross-linking agents, such as, for example, diisocyanates, carbodiimides, diacid chlorides, cyclic diepoxides and the like. Examples of specific effective crosslinking agents include hexamethylenediisocyanate, methylene di-p-phenyldiisocyanate, 1,3-dicyclohexyl carbodiimide, dodecanedioyl dichloride, adipoyl chloride and 1,2,5,6-diepoxycyclooctane. The crosslinking agents are employed in amounts conventionally employed to obtain desired cross-linking of the polymer which, by use of such agents, can take place at slightly elevated or ambient temperatures.

Since various changes may be made in the invention without departing from its spirit and essential characteristics, it is intended that all matter contained in the description shall be interpreted as illustrative only and not in a limiting sense, the scope of the invention being defined by the appended claims.

We claim:

1. Polymeric compositions comprising a blend of
   (a) from about 1 to about 95 percent by weight of amorphous fluoropolymer, with
   (b) from about 5 to about 95 percent by weight of a fluorinated copolymer of the formula

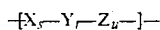

wherein s, t and u represent weight proportions of the respective X, Y and Z units, and have values within the ranges of
   s = from about 0.95 to about 0.99;
   t = from about 0.0025 to about 0.0475; and
   u = from about 0.0025 to about 0.0475;
   with the the sum of s+t+u being 1;
   X represents units of the composition

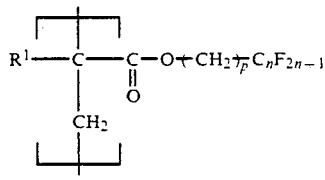

wherein
   $R_1$ is H, —CH$_3$ or mixtures thereof;
   p is 1 or 2;
   n is an integer of from about 1 to about 40;
   Y represents units of the composition

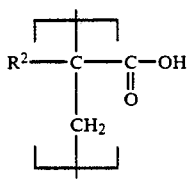

wherein $R^2$ is H, —CH$_3$, or —CH$_2$COOH;
   Z represents units of the composition

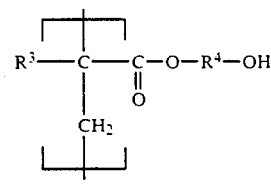

wherein
   $R^3$ is H, —CH$_3$, or —CH$_2$COOC$_m$H$_{2m+1}$, wherein m is an integer of from about 1 to about 4; and
   $R^4$ is an alkylene bridging group, straight chain, branched or cyclic, having from 1 to about 8 carbon atoms;
   wherein the X, Y and Z units may be arranged in any sequence, said amorphous fluoropolymer retaining its amorphicity in said blend and not phase separating during and after any curing.

2. Polymeric compositions according to claim 1 wherein the amorphous fluoropolymer is a copolymer of tetrafluoroethylene and a comonomer selected from the group consisting of CH$_2$=CHF; CH$_2$=CF$_2$; CF$_2$=CHF; CH$_2$=CH—C$_n$F$_{2n+1}$; CF$_2$=CClF; CF$_2$=CF—CF$_3$; CF$_2$=CF—O—C$_n$F$_{2n+1}$; CF$_2$=CF—O—CF$_2$CF(CF$_3$)—O—CF$_2$CF$_2$SO$_2$F; CF$_2$=CF—O—CF$_2$CF(CF$_3$)—O—CF$_2$CF$_2$COOCH$_3$, and

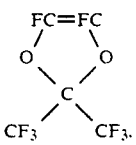

and mixtures thereof.

3. A polymeric composition according to claim 2 wherein the amorphous fluoropolymer is a copolymer of tetrafluoroethylene and

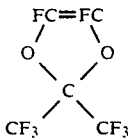

4. A polymeric composition according to claims 1, 2 or 3 wherein in the X units p is 2, and n in the C$_n$F$_{2n+1}$ moieties is an integer of from about 2 to about 30.

5. A polymeric composition according to claim 4 wherein the Y and Z units are present in about equimolar proportions.

6. A polymeric composition according to claims 1, 2, 3 or 4 wherein $R^1$, $R^2$ and $R^3$ are each independently selected from the group consisting of H and CH$_3$, and mixtures thereof.

7. A cross-linked composition according to any one of claims 1, 2, 3, 4, 5 or 6.

8. A substrate having deposited thereon a polymeric composition according to any one of claims 1, 2, 3, 4, 5 or 6.

9. A substrate having deposited thereon a crosslinked composition according to claim 7.

* * * * *